Nov. 10, 1970 A. E. CUTLER 3,539,718

ELECTRONIC TYPE COMPOSING APPARATUS

Filed Feb. 23, 1967 3 Sheets-Sheet 2

Nov. 10, 1970 A. E. CUTLER 3,539,718

ELECTRONIC TYPE COMPOSING APPARATUS

Filed Feb. 23, 1967 3 Sheets-Sheet 3

3,539,718

ELECTRONIC TYPE COMPOSING APPARATUS

Albert Ernest Cutler, Barnet, England, assignor to Communications Patents Limited Filed Feb. 23, 1967, Ser. No. 618,003
Claims priority, application Great Britain, June 3, 1966, 24,905/66
Int. Cl. H04n 7/18
U.S. Cl. 178—6.8 5 Claims

ABSTRACT OF THE DISCLOSURE

This invention relates to electronic type composing apparatus in which a selected type character is produced by scanning the selected, corresponding area of a type-character matrix, by means of a first cathode ray tube, and reproducing the selected character thus scanned on the screen of a second cathode ray tube.

The invention provides scanning means for the second cathode ray tube, employing a correction signal, derived from an optical mark associated with the selected type character, for correcting error in the position of the reproduced character on the screen of the second tube.

This invention relates to electronic type composing apparatus and in particular to electron beam deflection apparatus for association with a cathode ray tube of such apparatus, whereby images of selected characters, reproduced by the cothode ray tube, can be accurately positioned on the screen of the tube.

It is known to employ electronic circuit arrangements involving cathode ray tubes for the generation of images corresponding to alphabetical or numerical characters, in which character images are generated by raster scanning and beam modulation.

In this method, characters are generated by deflecting the spot of a first cathode ray tube to scan selected areas of a matrix of characters and these characters are reproduced on the screen of a second cathode ray display tube by controlling the intensity of the electron beam of the display tube during the sweep period of each line of the raster. This method of generating character images is preferred for type composing apparatus, because character forms of high quality can be provided, using cathode ray tubes of normal design. An example of an apparatus of this kind is described in our U.K. Pat. No. 965,613, filed on Aug. 9, 1962.

In such arrangements, deflection systems of high precision or deflection systems incorporating character position correcting means must be used, if high accuracy of registration of the reproduced characters is to be achieved.

It is an object of the present invention to provide improved cathode ray tube deflection apparatus for electronic type composing apparatus of the kind using first and second cathode ray tubes for the generation and reproduction of characters by raster scanning, whereby character images reproduced by the second cathode ray tube are positioned with a high degree of accuracy independently of drift or variations in the magnitude of control signal voltages by which the desired characters are selected, and independently of the linearity of the deflection characteristics of the first cathode ray tube.

Accordingly, the present invention provides electronic type composing apparatus including a first cathode ray tube having a fluorescent screen upon which a luminous spot is formed by a focused electron beam, provided in association with electron beam deflecting means for deflecting the spot in a circular path over a portion of the fluorescent screen of the tube, an optical surface arranged to receive light from the fluorescent screen, the optical surface having a plurality of areas of different reflectivity or transmissivity, each area defining a selected position on the fluorescent screen, a type-character matrix arranged to receive light from the fluorescent screen so that each said position corresponds to a selected character of the matrix, the selection of the character being effected by signals fed to said electron beam deflecting means, means for scanning an area of the fluorescent screen corresponding to a selected character after the spot has been deflected in a circular path at the selected position, light sensitive means for providing electric signals corresponding to the illuminated character for feeding to a second cathode ray tube, the said second cathode ray tube having deflection means for reproducing from the selected electronic signal an image corresponding to the selected character, and correction signal generating means, fed with signals derived from signals by which the spot is deflected in a circular path and with a signal provided by light sensitive means associated with the optical surface, the correction signals generated by the correction signal generating means being fed to the deflecting means of the second cathode ray tube, so that errors in the position of the reproduced character images are corrected.

In order that the invention may be more readily carried into effect, an embodiment thereof will now be described in detail, by way of example, with reference to the accompanying drawings, in which.

In the apparatus to be described, it is assumed that the text of the matter to be printed has been prepared, using a keyboard machine of conventional type to provide a tap record of the prepared text, which includes length of line, line spacing and line justification information. Further, it is assumed that the tape is fed to a sensing device which provides signals for controlling the character generating apparatus of the invention and signals for controlling mechanism by which photo-sensitive material is moved so as to produce lines and columns of type. The mechanism controlling the movement of the photo-sensitive material does not form a part of the present invention and is not described.

Figure 1:
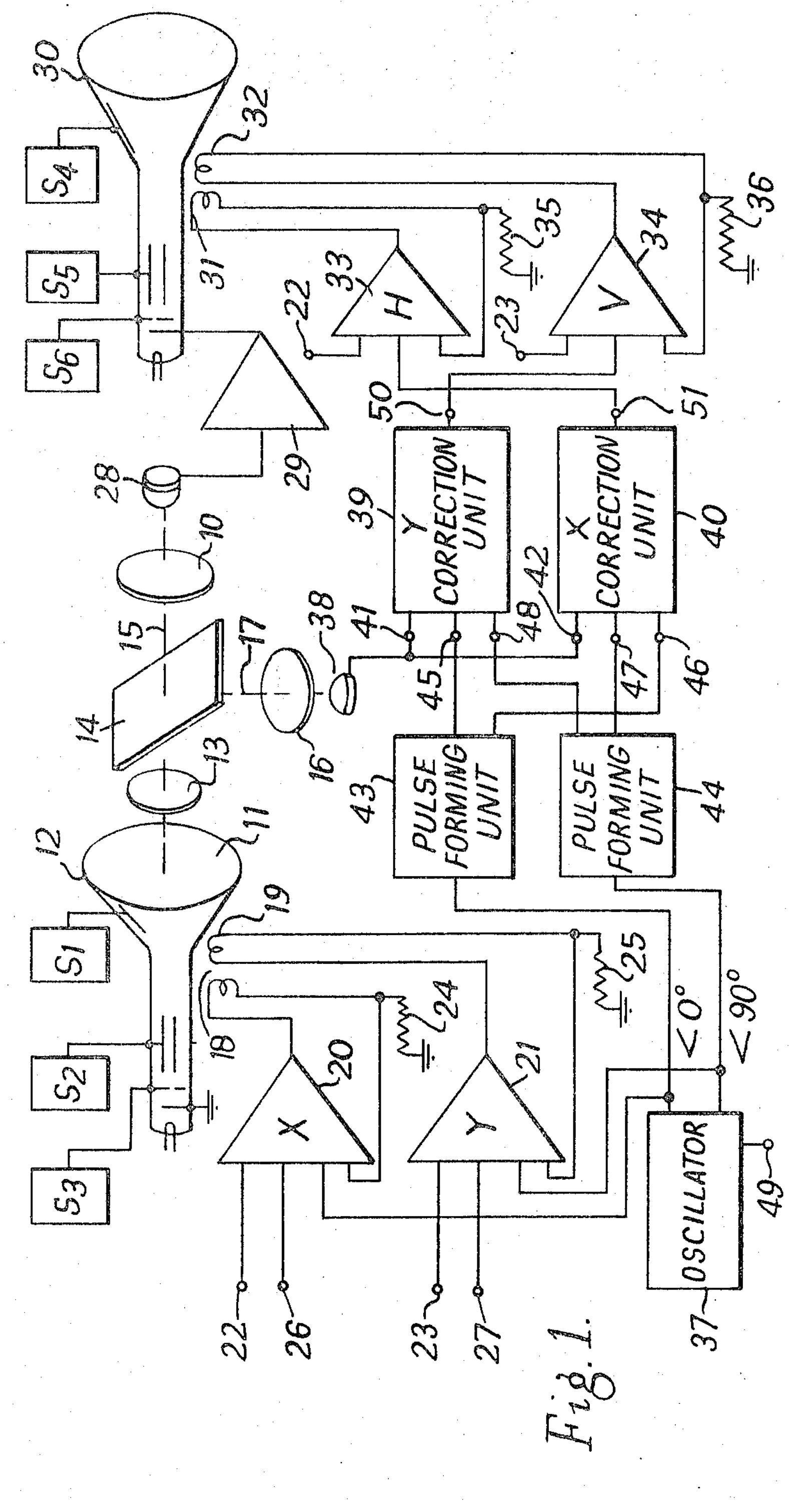
FIG. 1 is a simplified schematic diagram of an electronic type composing apparatus incorporating correction means whereby high accuracy of registration of the reproduced characters is provided.

Referring to FIG. 1, alpha-numeric symbols, represented as transparent areas of a character matrix 10, are illuminated by light received from a fluorescent screen 11 of a first cathode ray tube 12, by way of an object lens 13 and a semi-silvered mirror 14. The lens 13 is mounted with its optical axis 15 normal to the fluorescent screen 11. The semi-silvered mirror 14 is mounted with its partially reflecting surface inclined at an angle of 45 degrees with respect to the optical axis 15, so that an optical surface 16, mounted with its surface normal to the axis of reflection 17 of the mirror 13, is also illuminated by light received from the fluorescent screen 11.

The optical surface 16 is provided with a plurality of reference marks, each mark defining a different position on the fluorescent screen 11. The character matrix 10 is arranged so that each position on the fluorescent screen 11 defined by a reference mark corresponds to a different character. In this example, the reference marks are of L-shaped form, the two limbs being of equal length and at right angles to each other. The reference marks are arranged on the optical surface 16 in rows and columns with their limbs uniformly spaced apart. The optical surface 16 is oriented so that the limbs of the reference marks are parallel to the X and Y deflection axes of the cathode ray tube 12.

The electrodes of the cathode ray tube 12 are supplied with current from direct current sources $S_1$, $S_2$, and $S_3$, to produce a focussed spot on the fluorescent screen 11. The spot is deflected by currents fed to deflection coils 18 and 19, from X and Y deflection amplifiers 20 and 21 respectively.

The amplifiers 20 and 21 are fed with sawtooth waveforms from terminals 22 and 23 respectively, connected to the outputs of frame and line waveform generators, which are not shown.

Feedback is provided to the inputs of the amplifiers by resistors 24 and 25 connected in series with the deflection coils 18 and 19 respectively. A rectangular raster is produced on the screen of the tube 12, of a size such that an area corresponding to the area occupied by a character is scanned by the projected image of the spot. Signals derived from the tape record are fed to the inputs of the amplifiers 20 and 21 from terminals 26 and 27 respectively, to position the raster so that a selected character is illuminated by the raster.

The light transmitted by the matrix 10 is collected by a condenser lens of a lens/photo-multiplier unit 28 mounted so that its optical axis and the optical axis 15 are common. Electric signals generated in the photo-multiplier unit by the light variations produced during the scanning of a character are fed to the input of a video amplifier 29. The output signal of the amplifier 29 is fed to the cathode of a second cathode ray tube 30 to modulate the beam intensity of the tube. The electrodes of the tube 30 are supplied with current from direct current sources $S_4$, $S_5$ and $S_6$ to produce a focussed spot on the screen of the tube. Deflection coils 31 and 32 are fed with currents from deflection amplifiers 33 and 34 respectively.

Feedback is provided to the input of the amplifiers by resistors 35 and 36 connected inseries with the deflection coils 31 and 32 respectively. The amplifiers are fed with sawtooth waveforms from terminals 22 and 23, so that the scanning rasters of the cathode ray tubes 12 and 30 are in synchronism. Thus, an image is provided on the screen of the tube 30 corresponding to the character selected by the positioning signals fed to the terminals 26 and 27.

In the arrangement so far described, it is necessary for the positioning signals to have a high order of stability and for the linearity of the deflection system of the cathode ray tube 12 to be maintained, also for the signals to be of correct magnitude if accurate registration of the reproduced characters is to be achieved.

The stability and linearity requirements of the system may be reduced if correction signals, of appropriate polarity, representing inaccuracy in the positioning of the spot with respect to a reference mark corresponding to a desired character, are fed to the amplifiers 33 and 34 prior to the scanning of the selected character.

The correction signals are generated by feeding reference pulses, derived from an oscillator 37 and pulses obtained from the photo-multiplier of a lens/photo-multiplier unit 38, to X and Y correction units 39 and 40 respectively. The correction units 39 and 40 will be described in detail later in this specification.

The oscillator 37, which is of conventional design, provides sine and cosine signal voltage outputs, designated $<0°$ and $<90°$ in the drawing, having a frequency of 10,000 cycles/sec. approximately, in this example. The sine and cosine signal voltages are of the same amplitude and are fed to inputs of the deflection amplifiers 20 and 21 respectively, to provide a circular time base, so that the spot on the fluorescent screen 11 is deflected to follow a circular path.

The sine and cosine signal voltages are of an amplitude such that the length of the radius of the circle traced by the image of the spot on the optical surface 16 is approximately one-fifth of the distance between similar points of adjacent reference marks on the surface. The light received by the lens of the lens/photo-multiplier unit 38 is interrupted as the spot, in tracing its circular path, passes over the opaque parts of a reference mark, so that two signal pulses are produced by the photo-multiplier. These input pulses are fed to input terminals 41 and 42 of the correction units 39 and 40 respectively.

The sine and cosine signal voltages are also fed to input terminals of pulse forming units 43 and 44 respectively. In the units 43 and 44, the sine and cosine signals are amplified and limited to produce substantially square waveforms and these waveforms are applied to capacitor/resistor networks in which they are differentiated so as to provide output pulses at instants of time when the sine and cosine signals amplitudes pass through zero. The output pulses of the pulse forming unit 43 are fed to input terminals 45 and 46 of the correction units 39 and 40 respectively. The output pulses of the pulse forming unit 44 are fed to input terminals 47 and 48 of the correction units 40 and 39 respectively.

As mentioned earlier in the specification, signals for controlling the character generating apparatus are provided from a tape record. In order to avoid distortion of the generated character forms it is necessary to remove the sine and cosine input signals before the scanning waveforms are applied to terminals 22 and 23. This is achieved by a control signal, which is fed to a terminal 49 of the oscillator 37 to cut off the sine and cosine output signals.

A voltage of positive or negative polarity and of a magnitude corresponding to the error in position on the Y, −Y axis of the origin of the circular time-base with respect to the junction of the limbs of a reference mark, is fed from an output terminal 50 of the Y correction unit 39 to an input of the deflection amplifier 34.

A voltage of positive or negative polarity and of a magnitude corresponding to the error in position on the X, −X axis of the origin of the circular time-base with respect to the junction of the limbs of a reference mark, is fed from an output terminal 51 of the X correction unit 40 to an input of the deflection amplifier 33.

Figure 2:
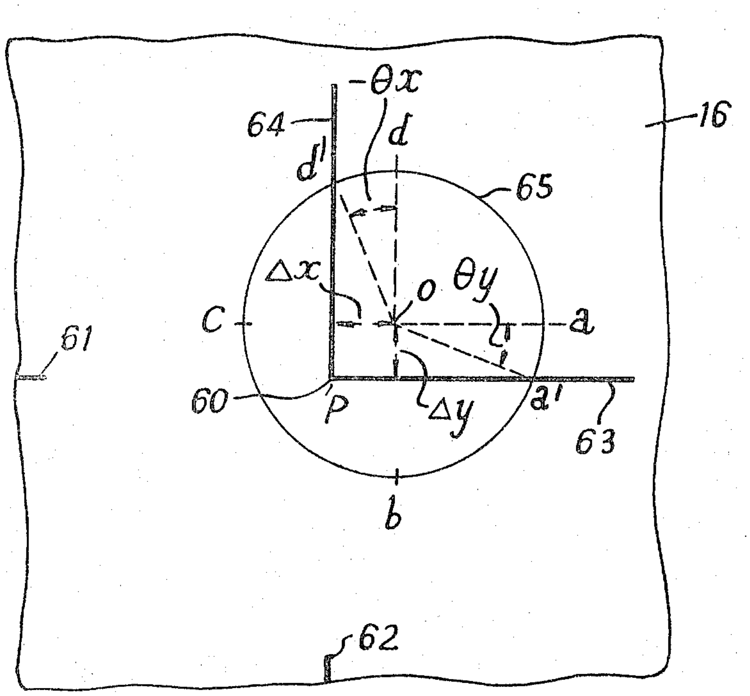
FIG. 2 is an enlarged fragmentary view of an optical screen of the apparatus.

In FIG. 2, a portion of the optical surface 16, FIG. 1, is shown. The optical surface has the form of a transparency with opaque reference marks upon its surface, one of the reference marks 60 and parts of adjacent reference marks 61 and 62 being shown in the drawing.

The optical surface is orientated so that one limb 63 of the reference mark 60 lies parallel to the X deflection axis and the other limb 64 lies parallel to the Y deflection axis of the cathode ray tube 12.

The path traced by the image of the spot of the cathode ray tube 12, on the optical surface 16, prior to scanning of a selected character, is indicated in the drawing by a circle 65 having its centre at O. Positions *a*, *b*, *c* and *d* on the circular trace correspond to angles $2/\pi$, $\pi$, $2/3\pi$ and $2\pi$ radians, representing instants of time when waveforms $A \sin wt$ and $A \cos wt$ producing the circular trace have zero or maximum amplitude.

The trace cuts the limb 64, to make an angle $-\theta x$ or $+\theta x$ with respect to the line O*d* when the centre O is displaced to the right or to the left of the limb 64 respectively, as shown in the drawing. The trace cuts the limb 63, to make an angle $+\theta y$ or $\theta y$ with respect to the line O*a* when the centre O is displaced above or below the limb 63 respectively, as shown in the drawing.

Therefore $$\Delta x = A \sin 2\pi \mp \theta x$$

and $$\Delta y = A \cos \frac{\pi}{2} \pm \theta y$$

where $\Delta x$ and $\Delta y$ represent displacements along $x$ and $y$ axes of the centre O and A corresponds to the radius of the circular trace.

If the displacements are small compared with A then $$\Delta x = \mp A.\theta x$$
$$\Delta y = \mp A.\theta y$$

For example, let it be assumed that as a result of errors, in the magnitudes of the signals fed to terminals 26 and 27, FIG. 1, the centre O of the circular trace is displaced from the desired reference point P, that is to say the junction of the limbs 63 and 64 of the reference mark 60. The spot crosses the limb 63 at *a'* making an angle $\theta y$ between broken lines O*a* and O*a'*, then $$\Delta y = A \cos \frac{\pi}{2} + \theta y/, = -A\theta y$$

the negative sign indicating that a correction in the position of the reproduced image, corresponding to a downward displacement of the spot is to be applied. The spot crosses the limb 64 at *d'* making an angle $-\theta x$ between broken lines O*d'* and O*d*, then $\Delta x = A \sin 2\pi - \theta x$, the negative sign indicating that a correction in the position of the reproduced image, corresponding to a leftward displacement of the spot is to be applied.

Figure 3:
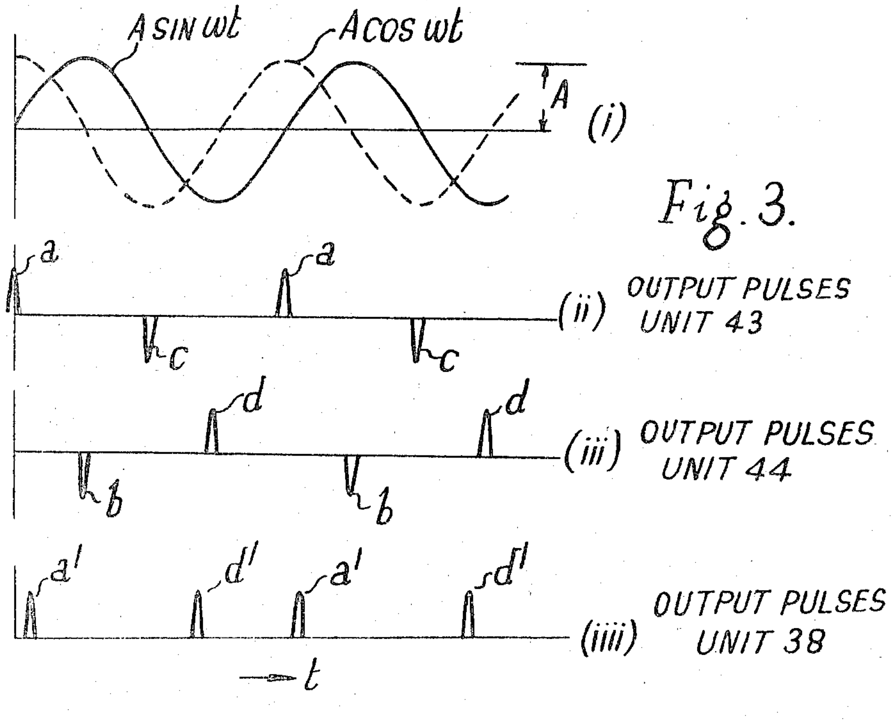
FIG. 3 is a diagram of waveforms of signals generated in the apparatus.

Referring to FIG. 1 and to FIG. 3, the waveforms of the signals fed to the deflection amplifiers 20 and 21 and the pulse forming units 43 and 44, corresponding to $A \sin wt$ and $A \cos wt$ respectively, are shown in graph (i).

Positive and negative going output pulses *a* and *c* respectively, produced by the pulse forming unit 43, are shown in graph (ii). It will be seen that the *a* and *c* pulses are produced at instants of time at which the $A \sin wt$ waveform is passing through zero and at which the trace is passing points *a* and *c* in FIG. 2.

Negative and positive going output pulses *b* and *d* respectively, produced by the pulse forming unit 44, are shown in graph (iii). It will be seen that the *b* and *d* pulses are produced at instants of time at which the $A \cos wt$ waveform is passing through zero and at which the trace is passing points *b* and *d* in FIG. 2.

As already stated, signal pulses are produced by the photo-multiplier of the lens/photo-multiplier unit 38 as the trace passes over the limbs of a reference mark. The amount by which the centre O of the trace is displaced along and X and Y axes, $\Delta x$ and $\Delta y$ respectively, is given by $\mp A.\theta x$ and $\mp A.\theta y$. The angle $\theta y$ is the angular difference between the positive going reference pulse *a* provided by the pulse forming unit 43 and a pulse produced by the lens/photo-multiplier unit 38 as the trace passes over the limb 63 of the reference mark 60, FIG. 2. The angle $\theta x$ is the angular displacement between the positive going reference pulse *d* provided by the pulse forming unit 44 and a pulse produced by the lens/photo-multiplier unit 38 as the trace passes over the limb 64 of the reference mark 60, FIG. 2.

In graph (iiii) of FIG. 3, positive going pulses produced by the lens/photo-multiplier unit 38 as the trace passes over the limbs 63 and 64 at instants of time *a'* and *d'* respectively in FIG. 2, are similarly indicated by the references *a'* and *d'* respectively.

The circuits of the Y and X correction units 39 and 40, FIG. 1, are similar; therefore, a detailed description of the unit 39 only will be given.

Figure 4:
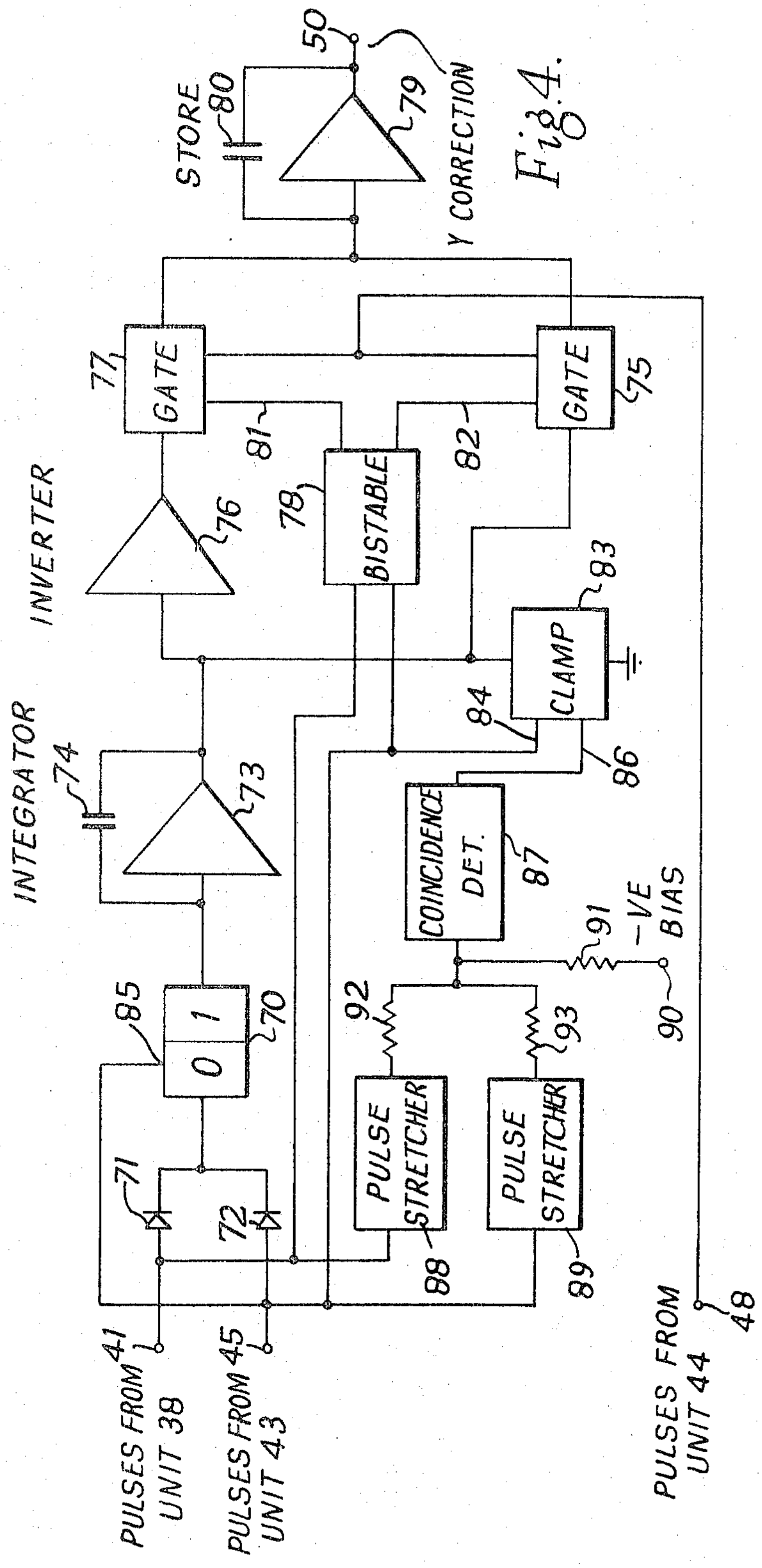
FIG. 4 is a block schematic diagram of one of the correction means of the apparatus of FIG. 1.

Referring to FIG. 4, in which the input terminals 41, 45 and 48 and the output terminal 50 are indicated with the same reference numbers as in FIG. 1, the pulses supplied to terminal 41 from the lens/photo-multiplier unit 38, FIG. 1, and the pulses supplied to terminal 45 from the pulse forming unit 43, FIG. 1, are fed to a scale-of-two counter 70, by way of diodes 71 and 72 respectively. The diodes are connected in a sense to allow positive going pulses only to be fed to the scale-of-two counter. The scale-of-two counter, which is of conventional design, is triggered by successive pulses applied to its input to be in a "1" state or a "0" state alternatively and is reset to the "0" state by a negative going pulse fed to a reset input.

The output of the counter 70 is fed to the input of a D.C. amplifier 73, having a capacitor 74 connected between its input and output terminals so as to function as an integrator. Thus, the magnitude of the output voltage produced by the amplifier 73 is directly proportional to the interval of time between a pulse by which the counter 70 is triggered to the "1" state and the next applied pulse, corresponding to the interval between *a* and *a'* or $\theta y$ in the example shown in FIG. 2.

The output signal produced by the amplifier is fed to the input of a gate 75, and to the input of an inverter amplifier 76, having unity gain. The output signal produced by the amplifier 76, of the same magnitude as the signal produced by the amplifier 73, but of opposite polarity, is fed to the input of a gate 77.

The gates 75 and 77 are controlled by a bistable unit 78 to pass the output signal from the amplifier 73 or the output signal from the amplifier 76 to the input of an amplifier 79, having a capacitor 80 connected from its output to its input, so as to function as a storage amplifier. The bistable unit 78, which is of conventional design, has its two inputs connected to the input terminals 41 and 45. An output voltage of negative polarity is provided on output line 81 of the bistable unit immediately following the occurrence of a voltage pulse on terminal 41, and an output voltage of negative polarity is provided on line 82 immediately following the occurrence of a voltage pulse on terminal 45.

The magnitude of the output signal from the integrator amplifier 73 and the output signal from the inverter amplifier 76 is proportional to the displacement $\Delta y$.

The direction in which the correction is to be applied is determined by the order in which the two voltage pulses occur in a given trace. This is achieved by taking a combination of each bistable output voltage with a reference pulse voltage which occurs after the two voltage pulses have been received. Such a pulse, indicated by the reference *b* in FIG. 3, is provided by the pulse forming unit 44, FIG. 1, and is fed to the input terminal 48.

The gate 75 or the gate 77 will operate according to whether the voltage pulse from the lens/photomultiplier unit 38, FIG. 1, or the voltage pulse due to the passage of the spot over the limb 63 of the reference mark 60, FIG. 2, was the last pulse before the occurrence of the reference pulse at position *b* of the spot, FIG. 2. If the *a'* pulse occurs last, as shown in FIG. 2, then a negative correction is required and the gate 77 is opened momentarily to feed the output voltage of the inverter amplifier 76 to the input of the storage amplifier 79. The voltage provided from the output of the storage amplifier and fed to the output terminal 50 is then of negative polarity. If the *a* pulse occurs last, then a positive correction is required and the gate 75 is momentarily opened to feed the output of the integrator amplifier 73 to the input of the storage amplifier 79. The voltage provided from the output terminal 50 is then of positive polarity.

After a transfer of voltage by the gate 77 or the gate 75, the output of the integrator amplifier 73 is clamped to zero by a clamping unit 83, so that the correction unit is restored to a correct condition for the start of the next cycle. The clamping unit 83, which is of conventional design, is actuated by a negative going reference pulse fed to an input 84 of the clamping unit from the input terminal 45, provided as the spot passes the point *c* in FIG. 2. The negative going reference pulse is also fed to a reset input 85 of the scale-of-two counter 70 to ensure that the counter is returned to the "0" state prior to the start of the next cycle, as is required for correct operation of the apparatus.

The clamping unit 83 is also actuated by a negative voltage pulse fed to an input 86 of the clamping unit from a coincidence detector 87. This is to ensure that no correction voltage is provided if the centre O of the trace is correctly positioned with respect to the reference mark 60, FIG. 2, by the signal fed to terminal 27, FIG. 1, and the pulses fed to terminals 41 and 45 are coincident or substantially coincident.

The pulses from input terminals 41 and 45 are fed to pulse stretcher units 88 and 89 respectively. These are monostable units in which the return to the non-triggered condition is delayed by an amount such that the duration, above a given level, of positive-going output voltage pulses provided by the units, is about 50% greater than the duration of the input pulses fed to them.

The output voltage pulses, provided by the pulse stretcher units and a bias voltage of negative polarity supplied to terminal 90, are fed by way of summing resistors 91, 92 and 93 to the inputs of the coincidence detector 87. In all conditions when the pulse from terminal 41 is not separate from the pulse from terminal 45, from the point of view of the scale-of-two counter 70, a pulse is fed to the input of the coincidence detector so that it is actuated for at least half of the duration of an input pulse.

The coincidence detector 87 is a monostable unit similar to the pulse stretcher units 88 and 89, having a delay somewhat longer than is provided for these units. Thus, in cases of ambiguity, an output pulse of the coincidence detector is fed to the clamping unit 83 so that the output of the integrator amplifier 73 is clamped to zero before it is sampled.

While the arrangement for overcoming ambiguity which has been described does not permit of correction of errors corresponding to the duration of 1½ pulse widths, the duration of a pulse can be made sufficiently short for this error to be acceptably small.

As already stated in the description with reference to FIG. 1, a voltage of positive or negative polarity, of a magnitude corresponding to the error in position on the X, —X axis of the origin of the circular time base with respect to the reference mark is provided from an output terminal 51 of the X correction unit 40.

The circuits of the Y and X correction units are similar, pulses from the lens/photomultiplier unit 38 and from the pulse forming unit 44 being fed to the input terminals 42 and 47 of the X correction unit 40. The reference pulse voltages by which the gates corresponding to the gates 75 and 77 are operated, is obtained from the output of the pulse forming unit 43 which is connected to terminal 46.

In the embodiment described, the reference marks of the optical surface 16, FIG. 1, from which the pulses fed to terminals 41 and 42 are derived, are opaque marks of L-shaped form. If desired, reference marks having the form of quarter discs may be used, the pulses being derived from the rising and falling light output provided as the spot passes over the edge of a mark.

The reference marks may be opaque marks on a transparent surface or vice versa, or the marks may be provided by reflective surfaces, the optical system of the associated photo-sensitive unit being arranged so as to receive light reflected from the optical surface.

Furthermore, the character matrix and the optical surface may be combined, each character having a reference mark associated therewith, of distinguishing light reflecting or transmitting characteristic. For example, the character matrix 10, FIG. 1, has in addition to characters represented as transparent areas, L-shaped reference marks of light reflecting material on the surface of the matrix receiving light from the cathode ray tube 12. Light sensitive means, corresponding to the lens/photocell unit 38, is arranged in relation to the surface of the matrix so that light reflected onto the light sensitive means, during deflection of the spot in a circular path, as the spot traverses each limb of a reference mark, produces the desired response.

In order to minimise noise effects, the circuit of a correction unit can be arranged so that integration is carried out over a specified number of cycles of the circular time-base. Alternatively, a smoothing circuit can be used so that a mean value of correction voltage over a definite number of cycles of the time-base is obtained.

What I claim is:

1. Electronic type composing apparatus including a first cathode ray tube having a fluorescent screen upon which a luminous spot is formed by a focussed electron beam, provided in association with electron beam deflecting means for deflecting the spot in a circular path over a portion of the fluorescent screen of the tube, an optical surface arranged to receive light from the fluorescent screen, the optical surface having a plurality of areas of different reflectivity or transmissivity, each area defining a selected position on the fluorescent screen, a type-character matrix arranged to receive light from the fluorescent screen so that each said position corresponds to a selected character of the matrix, the selection of the character being effected by signals fed to said electron beam deflecting means, means for scanning an area of the fluorescent screen corresponding to a selected character after the spot has been deflected in a circular path at the selected position, light sensitive means for providing electric signals corresponding to the illuminated character for feeding to a second cathode ray tube, the said second cathode ray tube having deflection means for reproducing from the selected electronic signal an image corresponding to the selected character, and correction signal generating means, fed with signals derived from signals by which the spot is deflected in a circular path and with a signal provided by light sensitive means associated with the optical surface, the correction signals generated by the correction signal generating means being fed to the deflecting means to the second cathode ray tube, so that errors in the position of the reproduced character images are corrected, the said areas being reference marks comprising perpendicular limbs orientated so as to be parallel with the X and Y deflection axes of the first cathode ray tube.

2. Electronic type composing apparatus including a first cathode ray tube having a fluorescent screen upon which a luminous spot is formed by a focussed electron beam, provided in association with electron beam deflecting means for deflecting the spot in a circular path over a portion of the fluorescent screen of the tube, an optical surface arranged to receive light from the fluorescent screen, the optical surface having a plurality of areas of different reflectivity or transmissivity, each area defining a selected position on the fluorescent screen, a type character matrix arranged to receive light from the fluorescent screen so that each said position corresponds to a selected character of the matrix, the selection of the character being effected by signals fed to said electron beam deflecting means, means for scanning an area of the fluorescent screen corresponding to a selected character after the spot has been deflected in a circular path at the selected position, light sensitive means for providing electric signals corresponding to the illuminated character for feeding to a second cathode ray tube, the said second cathode ray tube having deflection means for reproducing from the selected electronic signal an image corresponding to the selected character, and correction signal generating means, fed with signals derived from signals by which the spot is deflected in a circular path and with a signal provided by light sensitive means associated with the optical surface, the correction signals generated by the correction signal generating means being fed to the deflecting means of the second cathode ray tube, so that errors in the position of the reproduced character images are corrected, the said areas being reference marks comprising quarter discs arranged about perpendicular axis parallel with the X and Y deflection axes of the first cathode ray tube.

3. Electronic type comprising apparatus including a first cathode ray tube having a fluorescent screen upon which a luminous spot is formed by a focussed electron beam, provided in association with electron beam deflecting means for deflecting the spot in a circular path over a portion of the fluorescent screen of the tube, an optical surface arranged to receive light from the fluorescent screen, the optical surface having a plurality of areas of different reflectivity or transmissivity, each area defining a selected position on the fluorescent screen, a type-character matrix arranged to receive light from the fluorescent screen so that each said position corresponds to a selected character of the matrix, the selection of the character being effected by signals fed to said electron beam deflecting means, means for scanning an area of the fluorescent screen corresponding to a selected character after the spot has been deflected in a circular path at the selected position, light sensitive means for providing electric signals corresponding to the illuminated character for feeding to a second cathode ray tube, the said second cathode ray tube having deflection means for reproducing from the selected electronic signal an image corresponding to the selected character, and correction signal generating means, fed with signals derived from signals by which the spot is deflected in a circular path, generated by feeding reference pulses derived from an oscillator providing sine and cosine output signals, said sine and cosine signals also controlling the beam deflection of the first cathode ray tube, said reference pulses coinciding with zero amplitudes of said sine and cosine signals, and said correction signal generating means also being fed with a signal provided by light sensitive means associated with the optical surface, the correction signals generated by the correction signal generating means being fed to the deflecting means of the second cathode ray tube, so that errors in the position of the reproduce character images are corrected.

4. Electronic type composing apparatus as claimed in claim 3, in which the sine and cosine output signals of the oscillator are amplified and limited to provide signals of substantially square waveform, which signals are differentiated to provide output pulses at the instants of time when the sine and cosine signals respectively pass through zero amplitude.

5. Electronic type composing apparatus as claimed in claim 3, in which a voltage of positive or negative polarity and of a magnitude representative of the error in position of the X, —X deflection axis of the first cathode ray tube and the corresponding axis of the said reference marks is used to correct the X deflection means of the second cathode ray tube and a voltage of positive or negative polarity and of a magnitude representative of the error in position of the Y, —Y deflection axis of the first cathode ray tube and the corresponding axis of the said reference marks is used to correct the Y deflection means of the second cathode ray tube.

References Cited

UNITED STATES PATENTS

| | | | |
|---|---|---|---|
| 3,015,730 | 1/1962 | Johnson. | |
| 3,087,087 | 4/1963 | McNaney. | |
| 3,244,896 | 4/1966 | Walker. | |
| 3,276,008 | 9/1966 | Haverbach | 340—324.1 |
| 3,281,822 | 10/1966 | Evans | 340—324.1 |
| 3,349,172 | 10/1967 | Mauchel | 340—324.1 |

RICHARD MURRAY, Primary Examiner

J. A. ORSINO, JR., Assistant Examiner

U.S. Cl. X.R.

340—324; 250—217